H. A. BALCOME.
ELECTRIC MOTOR AND BRAKE.
APPLICATION FILED JAN. 28, 1905.

1,060,966.

Patented May 6, 1913.

Witnesses
Edward S. Day
Farnum F. Dorsey

Inventor
Herbert A. Balcome
by his Attorneys
Phillips Van Duren & Fish

UNITED STATES PATENT OFFICE.

HERBERT A. BALCOME, OF BOSTON, MASSACHUSETTS, ASSIGNOR TO B. F. STURTEVANT COMPANY, OF BOSTON, MASSACHUSETTS, A CORPORATION OF MASSACHUSETTS.

ELECTRIC MOTOR AND BRAKE.

1,060,966.  Specification of Letters Patent.  Patented May 6, 1913.

Application filed January 28, 1905. Serial No. 242,994.

*To all whom it may concern:*

Be it known that I, HERBERT A. BALCOME, a citizen of the United States, residing at Jamaica Plain, Boston, in the county of Suffolk and State of Massachusetts, have invented certain new and useful Improvements in Electric Motors and Brakes; and I do hereby declare the following to be a full, clear, and exact description of the invention, such as will enable others skilled in the art to which it appertains to make and use the same.

The present invention relates to an improvement in electric motors and brakes.

The object of the invention is to improve the construction of electric motors provided with automatic electrically released brakes.

The invention consists in the electric motor and brake hereinafter described and particularly defined in the claims.

Figure 1:
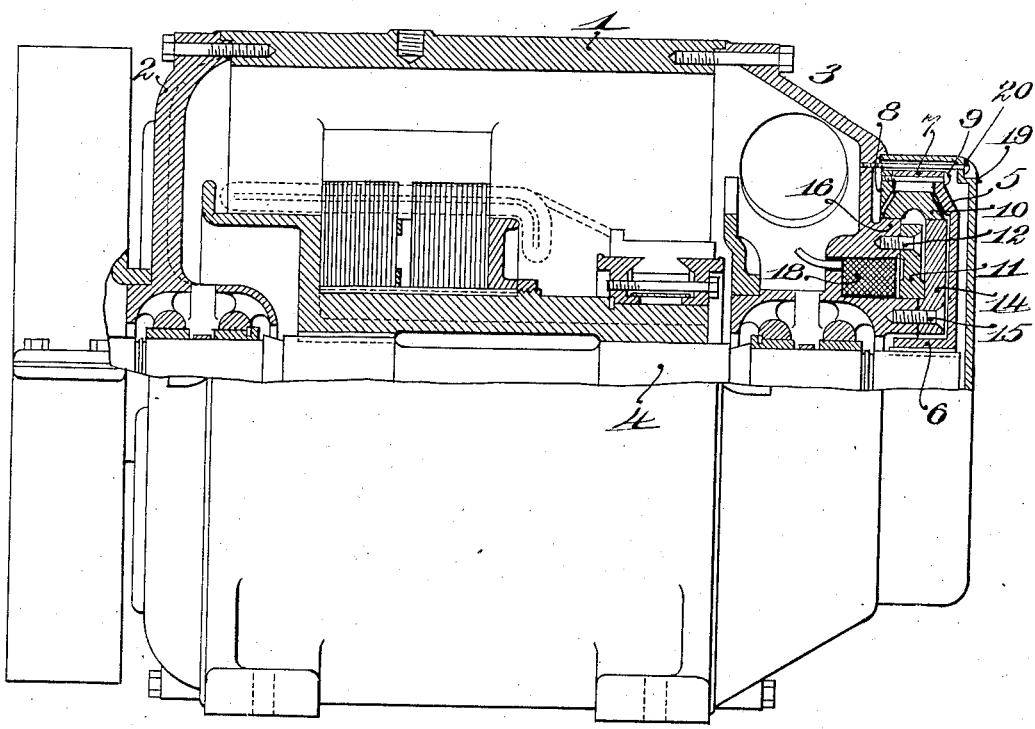
Figure 2:
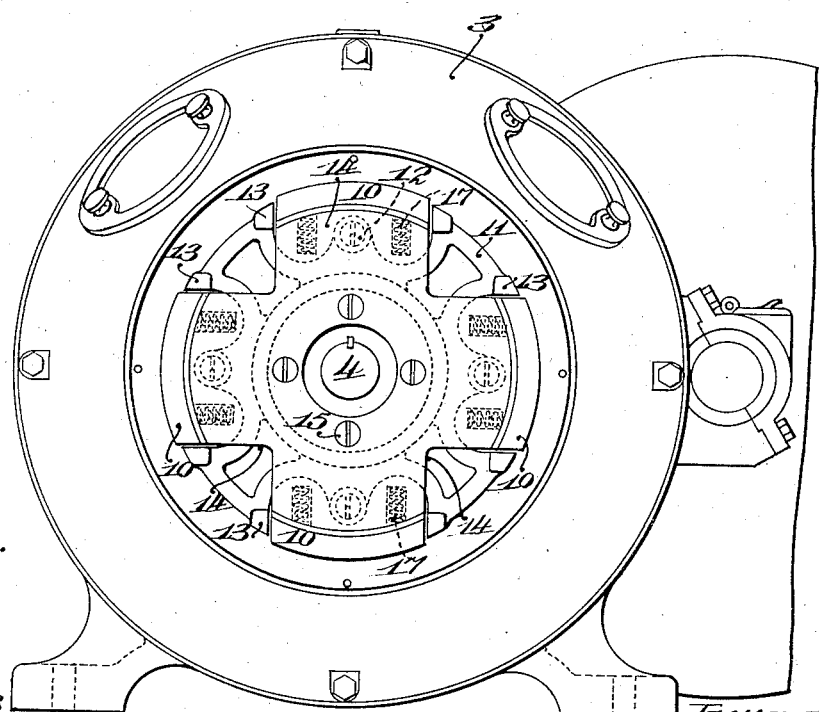

In the accompanying drawings Figure 1 is a side elevation of the preferred embodiment of the invention, of which the upper half is in section, and Fig. 2 is an end elevation with the brake cover removed.

The motor casing 1 is provided with heads 2 and 3 which carry the bearings for the armature shaft 4. The brake mechanism is located outside of the casing of the motor and in convenient position for access thereto for examination or repair. The brake mechanism consists of a brake disk 5 which is provided with a sleeve 6 splined to the armature shaft 4 whereby the sleeve 6 may slide longitudinally upon the shaft but is held from rotative movement with relation thereto. A cylindrical extension 7 from the outer periphery of the brake disk 5 carries the brake disk 8 which is secured to the brake disk 5 by means of bolts 9. The brake disks 5 and 8 are provided with inclined axially balanced braking surfaces as shown, which are adapted to be engaged by the axially balanced braking surfaces of the radially movable brake shoes 10. The brake shoes 10 are held in position from lateral displacement by the brake disks 5 and 8 and are supported by a brake shoe holder or spider 11 which is secured by screws 12 to the casing 3, the projections 13 of the brake shoe holder engaging the ends of the brake shoes 10 and thereby holding them from rotative movement. The brake disks and brake shoe holder are made of brass or some other nonmagnetic material. Two pole pieces are provided the faces of which correspond to the inner surfaces of the brake shoes and which when energized attract the brake shoes and hold them in the position shown in Fig. 1, springs being provided to force them outward when the magnet is deënergized. The pole piece 14 is cruciform in general shape and secured by screws 15 to the casing 3. The other pole piece constitutes a portion of the casing 3 indicated at 16. For each brake shoe four springs 17 are provided which are received in cavities in the pole pieces, two in each. A recess is provided in the casing 3 in which the brake coil 18 is placed. The brake coil 18 is connected either in series or in shunt with the motor circuit and when energized by the passage of the current therethrough the pole piece 16 of cast iron and the pole piece 14, preferably of soft steel, are energized thereby and attract the brake shoes and hold them out of engagement with the brake surfaces of the brake disks 5 and 8. When the current is discontinued in the coil 18 the brake magnet is deënergized and the springs 17 force the brake shoes 10 outwardly into engagement with the brake surfaces of the brake disks 5 and 8, and inasmuch as the brake shoe holder 11 holds the brake shoes from rotative movement they thereby apply a heavy braking to the armature shaft. A cover 19 of sheet metal is secured by bolts 20 to the casing 3. The compactness of this construction, its accessibility and the efficiency of the mode of application of the brake are such as to commend it.

It will be observed that the brake mechanism occupies but a small space, and being supported upon the head of the motor casing involves the addition of but few parts to the motor. The brake mechanism taken as a whole is very light considering the effective braking power, and the construction by virtue of which the weight of the brake magnet is supported by the head instead of by the shaft is also a matter of importance. The radial movement of the brake shoes in the application of the brake is another feature which contributes to the utility of the construction, as also the inclining of the surfaces, whereby a wedging-action is secured. It is also to be noted that the application of the brake has no tendency to move the armature shaft endwise in its bearings and that as a consequence thrust bearings for the armature shaft may be dispensed with. Owing to the placing of the brake upon the outside of the motor case the heat resulting from the application of the brakes is more readily radiated than in prior constructions in which the brake mechanism is inclosed within the motor case. Another feature of this construction resides in the removability of the entire brake mechanism without dismantling the motor.

Having thus described the invention, what is claimed is:—

1. A brake for an electric motor having a shaft, having, in combination, axially balanced disks mounted to move longitudinally upon the motor shaft, radially movable brake members, an electro-magnet for holding said brake members from, and means for forcing them into contact with said brake disks, and means for holding the brake members from rotative movement, substantially as described.

2. A brake for an electric motor having a shaft, having, in combination, friction disks mounted to slide longitudinally upon the motor shaft, radially movable brake members adapted, when moved radially, to engage and apply braking force to said disks, a spider for holding said brake members from rotative movement, an electro-magnet for holding the brake members from engagement with the friction disks, and springs for forcing the brake members into engagement with the friction disks, substantially as described.

3. A brake for an electric motor having a shaft, having, in combination, friction disks mounted to slide longitudinally upon the motor shaft, radially movable brake members, a spider for holding the brake members from rotative movement, means for forcing the brake members into engagement with the friction disks, and an electro-magnet for withdrawing them from engagement therewith, substantially as described.

4. An electrically released brake for an electric motor which has a shaft and a casing, having, in combination, a rotatable friction member mounted on the shaft, a radially movable brake shoe mounted on the casing for engaging the rotatable friction member, a magnet winding in a recess formed in the outer face of the end of the casing, a pole face on the end of the casing facing radially outward, a pole plate secured to the end of the casing over the winding and having a pole face facing radially outward and coöperating with the pole face of the casing to hold the brake shoe from engagement with the rotatable friction member, and a spring for forcing the brake shoe into engagement with the rotatable friction member, substantially as described.

5. An electrically released brake for an electric motor which has a shaft and a casing, having, in combination, a rotatable friction member mounted on the shaft, a radially movable brake shoe for engaging the rotatable friction member, a pole piece secured to the end of the motor casing, a magnet having pole faces facing radially outward for holding the brake shoe from engagement with the rotatable friction member, one of said pole faces being formed on the end of the casing and the other of the said pole faces being formed on the pole piece, and a spring for forcing the brake shoe into engagement with the rotatable friction member, substantially as described.

In testimony whereof I affix my signature, in presence of two witnesses.

HERBERT A. BALCOME.

Witnesses:
HORACE VAN EVEREN,
FRED O. FISH.